United States Patent [19]

Kiyokawa

[11] Patent Number: 4,524,414
[45] Date of Patent: Jun. 18, 1985

[54] NUMERICAL CONTROLLER

[75] Inventor: Morio Kiyokawa, Nagoya, Japan

[73] Assignee: Mitsubishi Denki Kanushiki Kaisha, Tokyo, Japan

[21] Appl. No.: 446,198

[22] Filed: Dec. 2, 1982

[30] Foreign Application Priority Data

Dec. 9, 1981 [JP] Japan .................. 56-198177

[51] Int. Cl.³ .................. G06F 15/46; G06F 3/14
[52] U.S. Cl. .................. 364/171; 340/701; 340/712; 340/716; 364/189; 364/474
[58] Field of Search .............. 364/474, 475, 167–171, 364/188, 189; 340/701, 703, 711, 712, 716, 718

[56] References Cited

U.S. PATENT DOCUMENTS

| 4,078,257 | 3/1978 | Bagley | 340/712 X |
| 4,202,041 | 5/1980 | Kaplow et al. | 340/712 X |
| 4,280,121 | 7/1981 | Crask | 340/712 X |
| 4,303,973 | 12/1981 | Williamson, Jr. et al. | 364/189 |
| 4,333,097 | 6/1982 | Buric et al. | 340/365 VL |

Primary Examiner—Joseph Ruggiero
Attorney, Agent, or Firm—Leydig, Voit, Osann, Mayer and Holt, Ltd.

[57] ABSTRACT

The numerical controller is equipped with a setting display unit which comprises:
a display unit consisting of an echo data display area, a data display area, and a numerically-controlled operation status display area;
a total functional key group for selecting pictures that respond to desired functions;
a switching key for changing the background color of echo data displayed on the echo data display area in the display unit; and
an echo key group for setting or resetting effective echo data that are displayed on the echo data display area.

15 Claims, 11 Drawing Figures

```
POSITION
  RESET ( )
                              F 1 2 3 4 5
  < POSITION >
    X  - 1 2 3 4 5 . 6 7 8    F     1 2 3 4   < G >    1
    Y  +           . 0        M       1 2   4 0   1 7   8 0
    Z  +           . 0        S     1 2 3   4 4   9 1   9 8
    A  +           . 0        T       1 2
                              H       1 2 = + 1 2 3 4 5 6 7 8
  < C >
N 1 G 9 1 G 1 X 1 0 0 0 0 Y 2 0 0 0 0 F 1 2 3 4 *

1. POSITION / DATA I/O
2. OFFSET / ERASE
3. PARAMETER / MEMORY MAP
4. SEARCH / MEMORY EDIT
5. MDI
6. TOOL SET / TOOL LIFE
7. ALARM/DIAGNOSES
8. GRAPHIC

FIG. 5B

1. PARITY V CHECK / REWIND M 30
2. DRY-RUN G 00 / RESET M 0
3. INCH / M. POINT NEGLECT
4. ABS / EDIT LOCK
5. SYNCHRONOUS / M/C LOCK RAPID
6. ZER-RTN RAPIDLY / F 51
7. G 01 ERROR CHECK / F 1 DIGIT FEED
8. REWIND M 02 / DECIMAL POINT 2

FIG. 6A

1. [POSITION] / DATA I/O
2. OFFSET / ERASE
3. PARAMETER / MEMORY MAP
4. SEARCH / MEMORY EDIT
5. MDI
6. TOOL SET / TOOL LIFE
7. ALARM/DIAGNOSES
8. GRAPHIC

FIG. 6B

1. POSITION / DATA I/O
2. [OFFSET] / ERASE
3. PARAMETER / MEMORY MAP
4. SEARCH / MEMORY EDIT
5. MDI
6. TOOL SET / TOOL LIFE
7. ALARM/DIAGNOSES
8. GRAPHIC

1. POSITION DATA I/O
2. OFFSET ERASE
3. PARAMETER MEMORY MAP
4. SEARCH MEMORY EDIT
5. MDI
6. TOOL SET TOOL LIFE
7. ALARM/DIAGNOSES
8. GRAPHIC

1. POSITION DATA I/O
2. OFFSET ERASE
3. PARAMETER MEMORY MAP
4. SEARCH MEMORY EDIT
5. MDI
6. TOOL SET TOOL LIFE
7. ALARM/DIAGNOSES
8. GRAPHIC ize
NUMERICAL CONTROLLER

BACKGROUND OF THE INVENTION

The present invention relates to a numerical controller for controlling machine tools, and its object is to improve operability and discernibility of a setting display unit in the numerical controller.

The numerical controller, in general, is constructed as illustrated in FIG. 1. That is, the numerical controller denoted by 100 consists of an input unit 101 which introduces tool instructions, a memory unit 102 which stores tool instruction members introduced through the input unit 101, an output unit 103 which sends the tool instruction numbers stored in the memory unit 102 to a machine tool 110, an arithmetic unit 104, a control unit 105 which controls the input or memory operations, and the setting display unit 106 which sets tool data and machining data to the memory unit 102 and displays them. In particular, the present invention relates to the improvement of the setting display unit 106 in the numerical controller 100.

FIG. 2 shows a numerical control equipped with a conventional setting display unit, in which reference numeral 1 denotes a functional key unit for selecting various functions of the setting display unit. For instance, the functional key unit has a group of keys for suitably selecting such functions as position display function, parameter setting display function, search setting display function, compilation setting display function, and the like among the functions of the setting display unit. Reference numeral 2 denotes a data key unit for setting desired data responding to the functions selected by the functional key unit 1. The data key unit 2 consists of a alpha-numeric keys, contol keys, and the like. Reference numeral 3 denotes a data display unit which displays the functions selected by the functional key unit 1 and the data set by the data key unit 2. The data display unit 3 is made up of a cathode-ray tube (CRT) or the like.

Below is explained display operation of the setting display unit in the numerical controller.

First, a key responding to a desired function in the functional key unit 1 of the numerical controller is depressed, so that a picture responding to a desired function is displayed on the data display unit 3 for instance, when a position display function key of the functional key unit 1 is depressed, the display illustrated in FIG. 3 is made on the data display unit 3. Then, when a desired key in the data key unit 2 is depressed, a desired data is set on the displayed picture and is displayed. The numerical controller performs a desired operation based upon the thus set new data.

In the conventional numerical controller, the keys in the functional key unit are responding to the pictures displayed on the data display unit in a 1-to-1 manner. Therefore, the keys in the functional key unit must be provided in a number responding to the number of desired functions. Namely, when it is desired to increase the number of desired functions, the number of keys must be increased respondently, requiring increased areas for installing the keys. Further, increase in the number of functional keys results in complex operation for selecting keys in the functional key unit. Moreover, which keys are selected is not displayed, making it difficult to discriminate which keys are really depressed.

SUMMARY OF THE INVENTION

The present invention was accomplished in view of the above-mentioned circumstances, and its object is to provide a numerical controller having a setting display unit which features enhanced operability.

Another object of the present invention is to provide a numerical controller having a setting display unit which offers easily discernible display.

In order to accomplish the above-mentioned objects, the setting display unit in the numerical controller according to the present invention comprises:

a display unit which consists of an echo display area for displaying a plurality of sets of echo data, each set being composed of a pair of echo data, a data display area for displaying data, and a numerically-controlled operation status display area for displaying the numerically-controlled operation condition;

a total functional key group for selecting pictures that respond to desired functions of the display unit;

a switching key for switching the upper and lower stages such that either the upper stages or the lower stages of each of the sets of echo data displayed on the echo display area will become effective; and an echo key group which is provided to correspond to each of the sets of echo data displayed on the echo display area, and which sets or resets the echo data that are rendered effective by the switching key.

BRIEF DESCRIPTION OF THE DRAWINGS

FIGS. 5A and 5B illustrate change in the display condition on the echo data display area when keys in the total functional key group are depressed;

FIGS. 6A and 6B illustrate change in the display condition when echo keys are depressed;

DESCRIPTION OF THE PREFERRED EMBODIMENTS

Figure 1:
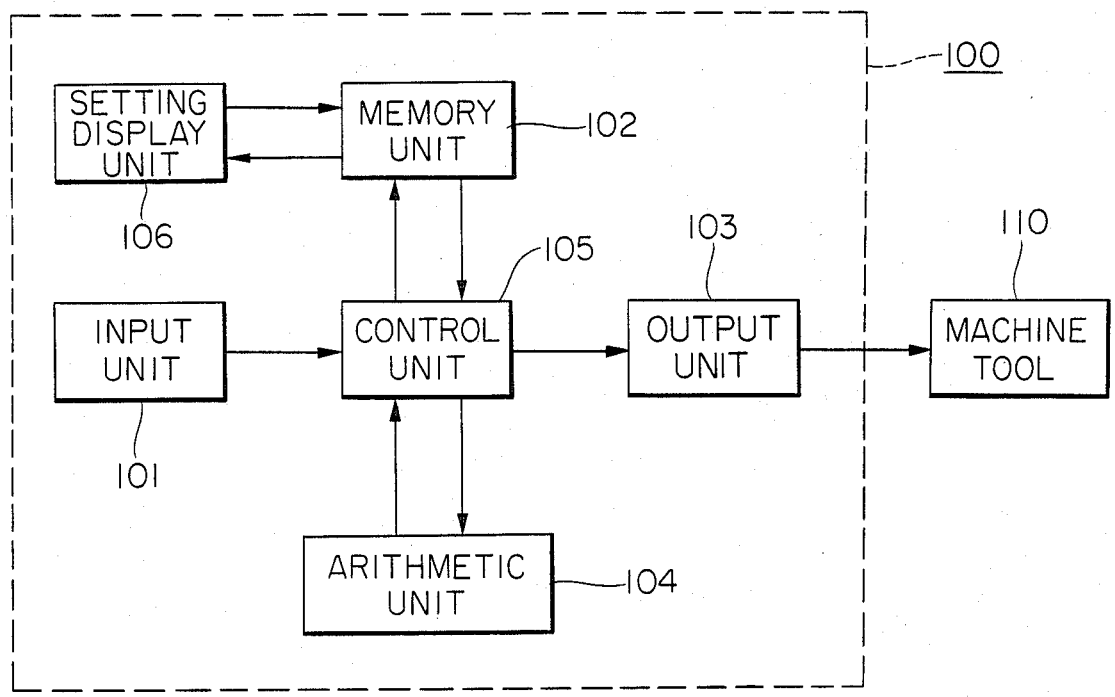
FIG. 1 is a block diagram which schematically illustrates the whole construction of a numerical controller.
Figure 2:
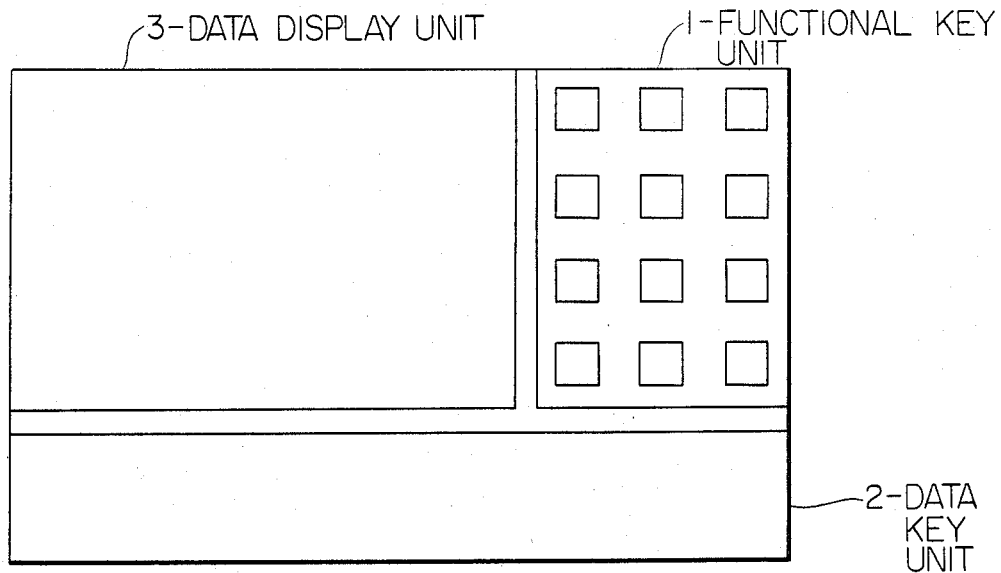
FIG. 2 is a front view illustrating a conventional setting display unit.
Figures 3, 4:
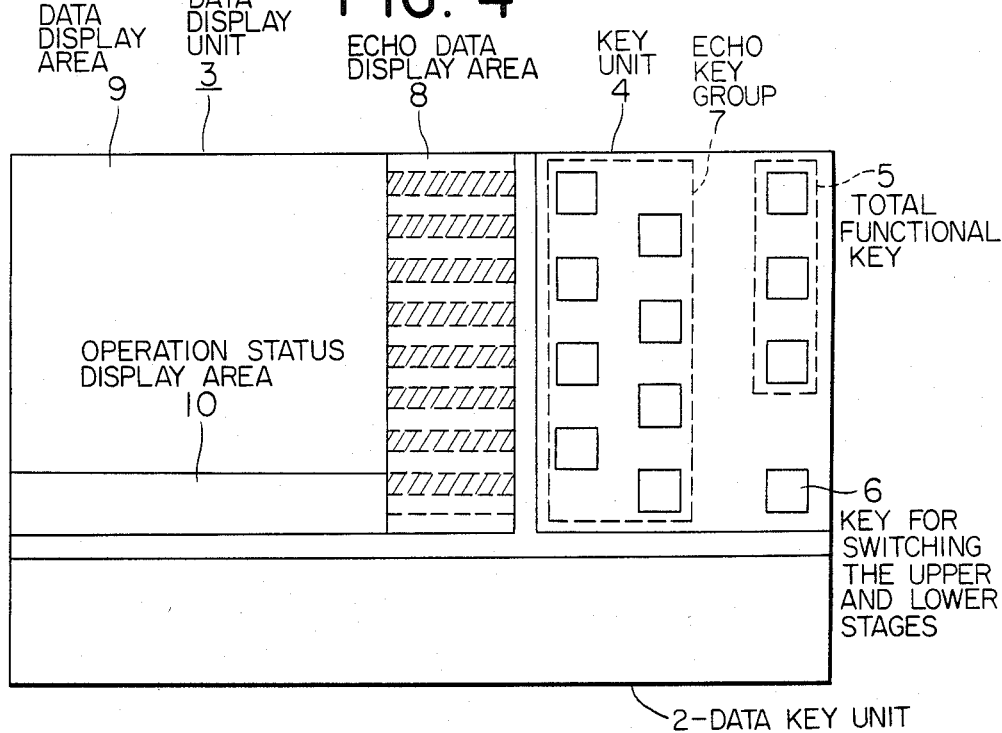
FIG. 3 is a diagram illustrating data displayed unit; on a data display unit of a conventional setting display
FIG. 4 is a front view of a setting display unit according to an embodiment of the present invention.

FIG. 4 shows a setting display unit according to an embodiment of the present invention, in which reference numeral 4 denotes a key unit for selecting total functions of the setting display unit, for switching the upper and lower stages, and for setting the functions to be effective or not effective. The key unit 4 consists of a total functional key group 5, a key 6 for switching the upper and lower stages, and an echo key group 7. The total functional key group 5 selects total functions, such as display function, parameter function, auxiliary function, and the like. That is, by selectively depressing the total functional key group 5, the individual key functions of the echo key group 7 can be determined. The key 6 for switching the upper and lower stages is selected by the total functional key 5 to switch the upper and lower stages of each of the sets of echo data each consisting of a pair of upper and lower stages displayed on an echo data display area 8 in a data display unit 3 that will be mentioned later. That is, in the embodiment of FIG. 4, the state in which the upper stages of each pair of echo data are selected on the echo data display area 8, is indicated by hatched areas. In practice, the background color of echo data of the upper stages which are selected changes from black to yellow.

The echo key group 7 is used to set the contents of echo data selected by the key 6 which switches the upper and lower stages. That is, in this embodiment, the echo key group 7 is arrayed in a zig-zag manner at positions responding to each of the pairs on the echo data display area 8, the keys being provided in a number responding to the number of pairs of echo data. By selectively depressing the echo keys in the echo key group 7, the echo data of the upper stage rendered effective by the switch 6, exhibit the effect. In the practical apparatus, background color of echo data selected by the echo keys changes from yellow to red.

Reference numeral 2 denotes a data key unit for setting desired data in response to the function selected by the echo key unit 4, and reference numeral 3 denotes the display unit which consists of a data display area 9 for displaying the function selected by the key unit 4 and the data set by the data key unit 2, a numerically-controlled operation status display area 10 for displaying the numerical-controlled operation condition, and the echo data display area 8 for displaying echo data.

Mentioned below is the display operation of the setting display unit of the numerical controller.

First, if any key in the total functional key group 5 in the key unit 4 of the numerical controller is depressed, the picture responding to a desired function is displayed on the echo data display area 8, on the data display area 9 and on the numerically-controlled operation status display area 10 of the display unit 3. Concretely speaking, when the PARAMETER key is depressed in the total functional key group 5 in which the DISPLAY key has been pushed, the display on the echo data display area 8 of the display unit 3 changes from FIG. 5A to FIG. 5B. Thus, echo data consisting of a pair of upper and lower stages responding to the echo key group 7 are displayed on the echo data display area 8.

Next, whether the upper stage of the thus displayed echo data is effective or the lower stage is effective, is determined by depressing the key 6 for switching the upper and lower stages. The echo data which are rendered effective by depressing the key 6, changes its background color. That is, in the embodiment of FIG. 4, the upper stages (hatched areas) are effective, and their background color becomes yellow. Then, echo keys in the echo key group 7 are selectively depressed to set or reset effective echo data that correspond to the depressed echo keys and that are displayed on the echo data display area 8. Due to the setting or resetting, the color of characters of echo data changes into, for example, red, so that the set or reset condition can be simultaneously discerned at a glance. The above-mentioned change is indicated being surrounded by a frame in FIGS. 6A and 6B. Further, the echo key group 7 may be arrayed in a zig-zag manner, and the echo keys may be grouped into two colors or more colors, to improve operability and discernibility.

The above-mentioned embodiment has dealt with the case when echo keys in the echo key group are arrayed in a zig-zag manner and are grouped into two colors. The same effect, however, can be exhibited even when the echo keys are arrayed being modified in a variety of other ways, and the echo keys are grouped into multiplicity of colors.

Figures 7, 8A, 8B:
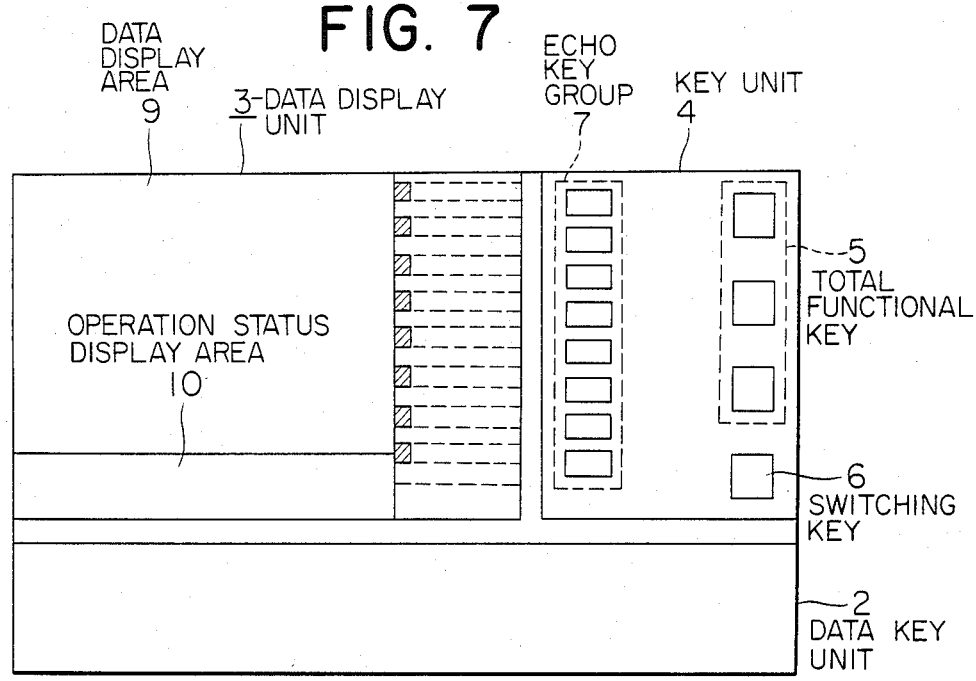
FIG. 7 is a front view of a setting display unit according to another embodiment of the present invention.
FIGS. 8A and 8B illustrate the condition when the upper and lower stages of the embodiment of FIG. 7 are switched.

FIG. 7 illustrates another embodiment according to the present invention. In the embodiment of FIG. 7, echo keys of the echo key group 7 are linearly arrayed in response to each pair of echo data. Further, markings at the heads of echo data change their color when the switching key 6 is depressed.

When the switching key 6 is depressed in this embodiment, the color of markings at the heads of echo data shifts from the upper stage to the lower stage as indicated by changing the positions of frames of numerals in FIGS. 8A and 8B; i.e., the echo data of the lower stages become effective.

In the embodiments of FIGS. 4 and 7, it is recommended that the display unit 3 is made up of a color CRT of a size of about 14 inches.

According to the present invention as mentioned above, the setting display unit is made up of a key unit which consists of a total functional key group, a switching key, and an echo key group, and the display unit is divided into a data display area, a numerically-controlled operation status display area, and echo data display area. Therefore, the setting display unit features improved operability and discernibility.

What is claimed is:

1. In a numerical controller comprising an input unit which introduces tool instructions, a memory unit which stores tool instruction numbers introduced through said input unit, an output unit which sends tool instruction numbers stored in said memory unit to a machine tool, an arithmetic unit, a control unit which controls said input unit or memory unit operation, and a setting display unit which sets tool data, machining data, and the like to said memory unit, said setting display unit comprises:
a display unit which includes an echo display area for displaying a plurality of sets of echo data, each set being composed of a pair of echo data, a data display area for displaying data, and a numerically-controlled operation status display area for displaying the numerically-controlled operation condition;
a total functional key group for selecting pictures that respond to desired functions of said display unit;
a switching key for switching the upper and lower stages such that either the upper stages or the lower stages of each of the sets of echo data displayed on said echo display area will become effective; and
an echo key group which is provided to respond to each of the sets of echo data displayed on said echo display area, and which sets or resets the echo data that are rendered effective by said switching key.

2. A numerical controller as set forth in claim 1, wherein the display unit consists of a cathode-ray tube.

3. A numerical controller as set forth in claim 2, wherein the cathode-ray tube is a color-display cathode-ray.

4. A numerical controller as set forth in claim 3, wherein echo data displayed on the echo display area change their background color on the stage that is selected by said switching key.

5. A numerical controller as set forth in claim 4, wherein the background color of echo data selected by the switching key changes from black to yellow.

6. A numerical controller as set forth in claim 4, wherein the echo data displayed on the echo display area change their background color when they are set by the echo keys.

7. A numerical controller as set forth in to claim 6, wherein the background color of echo data set by the echo keys changes from yellow to red.

8. A numerical controller as set forth in claim 4, wherein the color of data characters of echo data displayed on the echo display area is changed when the data characters are set by the echo keys.

9. A numerical controller as set forth in claim 3, wherein marking areas are provided at the heads of sets of echo data, and the color of said marking areas is changed on the stage selected by said switching key.

10. A numerical controller as set forth in claim 3, wherein the echo key group is disposed at positions responding to echo data displayed on the echo display area, and is arrayed in a zig-zag manner.

11. A numerical controller as set forth in claim 10, wherein the echo key group is grouped into different colors alternatingly.

12. A numerical controller as set forth in claim 10, wherein the echo key group is grouped by different colors.

13. A numerical controller as set forth in claim 3, wherein the echo key group is linearly arrayed at positions corresponding to echo data displayed on the echo display area.

14. In a numerical controller comprising an input unit which introduces tool instructions, a memory unit which stores tool instruction numbers introduced through said input unit, an output unit which sends tool instruction numbers stored in said memory unit to a machine tool, an arithmetic unit, a control unit which controls said input unit or memory unit operation, and a setting display unit which sets tool data, machining data, and the like to said memory unit, and displays them,
said setting display unit comprises:
a display unit which includes an echo display area for displaying a plurality of sets of echo data, each set being composed of a pair of echo data, a data display area for displaying data, and a numerically-controlled operation status display area for displaying the numerically-controlled operation condition;
a total functional key group for selecting pictures that correspond to desired functions of said display unit;
a switching key for switching the upper and lower stages and for changing the background color of echo data such that either the upper stages or the lower stages of each of the sets of echo data displayed on said echo display area will become effective; and
an echo key group which is arrayed in a zig-zag manner to correspond to each of the sets of echo data displayed on said echo display area, and which changes the background color of echo data by setting the echo data that are rendered effective by said switching key.

15. In a numerical controller comprising an input unit which introduces tool instructions, a memory unit which stores tool instruction numbers introduced through said input unit, an output unit which sends tool instruction numbers stored in said memory unit to a machine tool, an arithmetic unit, a control unit which controls said input unit or memory unit operation, and a setting display unit which sets tool data, machining data, and the like to said memory unit, and displays them,
setting display unit comprises:
a display unit which comprises an echo display area for displaying a plurality of sets of echo data, each set being composed of a pair of echo data, a data display area for displaying data, and a numerically-controlled operation status display area for displaying the numerically-controlled operation condition;
a total functional key group for selecting pictures that correspond to desired functions of said display unit;
a switching key for switching the upper and lower stages and for switching the color of markings at the heads of echo data, such that either the upper stages or the lower stages of each of the sets of echo data displayed on said echo display area will become effective; and
an echo key group which is linearly disposed to correspond to each of the sets of echo data displayed on said echo display area, and which changes the background color of echo data by setting the echo data that are rendered effective by said switching key.

* * * * *

UNITED STATES PATENT AND TRADEMARK OFFICE
CERTIFICATE OF CORRECTION

PATENT NO. : 4,524,414
DATED : June 18, 1985
INVENTOR(S) : Morio Kiyokawa

It is certified that error appears in the above-identified patent and that said Letters Patent is hereby corrected as shown below:

On the title page;

In naming of Assignee, "Kanushiki" should be changed to --Kabushiki--.

Signed and Sealed this

Eighth Day of October 1985

[SEAL]

Attest:

DONALD J. QUIGG

Attesting Officer

Commissioner of Patents and Trademarks—Designate